US012650295B2

(12) United States Patent
Zou et al.

(10) Patent No.: US 12,650,295 B2
(45) Date of Patent: Jun. 9, 2026

(54) SCATTERING MEASUREMENT METHOD AND SCATTERING MEASUREMENT DEVICE

(71) Applicant: Hangzhou HFC Semiconductor Co., Hangzhou (CN)

(72) Inventors: Zheng Zou, Hangzhou (CN); Jun He, Hangzhou (CN); Lezhong Wu, Hangzhou (CN)

(73) Assignee: HANGZHOU HFC SEMICONDUCTOR CO., Hangzhou (CN)

( * ) Notice: Subject to any disclaimer, the term of this patent is extended or adjusted under 35 U.S.C. 154(b) by 197 days.

(21) Appl. No.: 18/794,214

(22) Filed: Aug. 5, 2024

(65) Prior Publication Data

US 2026/0016285 A1     Jan. 15, 2026

(30) Foreign Application Priority Data

Jul. 10, 2024     (CN) .......................... 202410917499.6

(51) Int. Cl.
| | |
|---|---|
| *G01B 11/02* | (2006.01) |
| *G01B 11/08* | (2006.01) |
| *G01B 11/24* | (2006.01) |
| *G01B 11/26* | (2006.01) |

(52) U.S. Cl.
CPC .............. *G01B 11/02* (2013.01); *G01B 11/08* (2013.01); *G01B 11/24* (2013.01); *G01B 11/26* (2013.01)

(58) Field of Classification Search
CPC ......... G01B 11/02; G01B 11/08; G01B 11/24; G01B 11/26; G01B 11/22; G01N 21/01; G01N 21/47; G01N 2021/0112
See application file for complete search history.

(56) References Cited

U.S. PATENT DOCUMENTS

| | | | |
|---|---|---|---|
| 5,241,369 A | 8/1993 | McNeil et al. | |
| 5,867,276 A | 2/1999 | McNeil et al. | |
| 5,912,741 A | 6/1999 | Carter et al. | |
| 6,639,663 B1 | 10/2003 | Markle et al. | |
| 11,137,350 B2 * | 10/2021 | Wang ................ | G01B 11/0633 |
| 2006/0146347 A1 | 7/2006 | Smith et al. | |

FOREIGN PATENT DOCUMENTS

| | | |
|---|---|---|
| CN | 1224835 A | 8/1999 |
| CN | 105765463 A | 7/2016 |
| CN | 109001160 A | 12/2018 |
| CN | 109690235 A | 4/2019 |
| CN | 110261947 A | 9/2019 |

(Continued)

*Primary Examiner* — Jurie Yun
(74) *Attorney, Agent, or Firm* — MUNCY, GEISSLER, OLDS & LOWE, P.C.

(57) ABSTRACT

A scattering measurement method and a scattering measurement device are disclosed. In the scattering measurement method, wide-band IR measurement light is directed onto a substrate and then passes through a surface of the substrate and reaches a unit under measurement. The IR measurement light has a wavelength in the range of 2 μm to 7.5 μm, or of 25 μm to 35 μm. Scattered IR measurement light is then received from the substrate and the unit under measurement, from which characterizing parameters of the unit under measurement are determined.

10 Claims, 4 Drawing Sheets

Provide Substrate with Unit under Measurement Formed Therein, Which Extends through Portion of Substrate in Thickness Direction Thereof ———— S1

Direct Wide-band IR Measurement Light onto Substrate, Which Then Passes Through Surface of Substrate and Reaches Unit under Measurement, Wherein IR Measurement Light Has Its Wavelength In the Range of 2 μm To 7.5 μm, or of 25 μm To 35 μm ———— S2

Receive Scattered IR Measurement Light from Substrate and Unit under Measurement, from Which Characterizing Parameters of Unit under Measurement Are Determined, Wherein Characterizing Parameters Include at Least One of Diameter, Width, Depth and Sidewall Angle ———— S3

(56)　　　　　　References Cited

FOREIGN PATENT DOCUMENTS

| | | | |
|---|---|---|---|
| CN | 110313059 | A | 10/2019 |
| CN | 113366300 | A | 9/2021 |
| CN | 115682963 | A | 2/2023 |
| JP | H0196968 | A | 4/1989 |
| JP | H08264614 | A | 10/1996 |
| TW | 200426344 | A | 12/2004 |

* cited by examiner

SCATTERING MEASUREMENT METHOD AND SCATTERING MEASUREMENT DEVICE

CROSS-REFERENCE TO RELATED APPLICATION

This application claims the priority of Chinese patent application number 202410917499.6, filed on Jul. 10, 2024 and entitled "SCATTERING MEASUREMENT METHOD AND SCATTERING MEASUREMENT DEVICE", the entire contents of which are incorporated herein by reference.

TECHNICAL FIELD

The present invention relates to the field of semiconductor technology and, in particular, to a scattering measurement method and a scattering measurement device.

BACKGROUND

Optical scattering measurements are often performed with scatterometers on wafers to determine characterizing parameters of their surfaces, such as width (CD), depth, height and angle. When measurement light from a scatterometer strikes the surface of a wafer, it is scattered by the surface of the wafer. The resulting scattered light from the wafer surface is then collected by a detector and output as a measurement spectrum. Since the scattered light from the wafer surface carries characterizing information of the wafer surface, thus, characterizing parameters of the wafer, such as trench width, trench depth or trench sidewall angle, can be efficiently determined from analysis of the scattered light from the wafer surface. In the contemporary scattering measurement practice, broadband visible light of a wavelength in the range of 300 nm to 900 nm is commonly used as measurement light. Such light is typically suitable for measuring structures with a depth not exceeding 1 μm, such as a trench or buried layer formed in a substrate. However, when it is used to measure a structure with a depth greater than 1 μm, the scattered light would hardly contain characterizing information of the structure's bottom because the light itself is not able to effectively pass through the substrate to reach the bottom of the structure to be measured. Therefore, when using broadband visible light to measure a structure, the scattered light may not be able to effectively characterize the contour of the structure to be measured.

SUMMARY OF THE INVENTION

It is an object of the present invention to provide a scattering measurement method capable of measuring a deep feature in a substrate with higher sensitivity and therefore of effectively determining characterizing parameters of the unit under measurement in the substrate.

This object is attained by a scattering measurement method provided in the present invention, which comprises: providing a substrate with a unit under measurement formed therein, wherein the unit under measurement extends through a portion of the substrate in a thickness direction thereof; directing wide-band infrared (IR) measurement light onto the substrate, wherein the IR measurement light passes through a surface of the substrate and reaches the unit under measurement, wherein the IR measurement light has a wavelength in the range of 2 μm to 7.5 μm, or of 25 μm to 35 μm; and receiving scattered IR measurement light from the substrate and the unit under measurement, wherein characterizing parameters of the unit under measurement are determined from the scattered IR measurement light, and wherein the characterizing parameters include at least one of a diameter, a width, a depth and a sidewall angle.

On the basis of the same inventive concept, the present invention also provides a scattering measurement device comprising: a light source for providing wide-band infrared (IR) measurement light, wherein the IR measurement light passes through a surface of a substrate and reaches a unit under measurement in the substrate, wherein the unit under measurement extends through a portion of the substrate in a thickness direction thereof, and wherein the IR measurement light has a wavelength in the range of 2 μm to 7.5 μm, or of 25 μm to 35 μm; and a detector for receiving scattered IR measurement light from the unit under measurement, wherein characterizing parameters of the unit under measurement are determined from the scattered IR measurement light, and wherein the characterizing parameters include at least one of a diameter, a width, a depth and a sidewall angle.

In the scattering measurement method and device of the present invention, wide-band IR measurement light is directed onto a substrate and then passes through a surface of the substrate and reaches a unit under measurement. The IR measurement light has a wavelength in the range of 2 μm to 7.5 μm, or of 25 μm to 35 μm. Scattered IR measurement light is then received from the substrate and the unit under measurement, and characterizing parameters of the unit under measurement are determined from the scattered IR measurement light. The characterizing parameters include at least one of a diameter, a width, a depth and a sidewall angle. Since the wavelength of the IR measurement light is in the range of 2 μm to 7.5 μm, or of 25 μm to 35 μm, the IR measurement light can effectively travel through the substrate into the unit under measurement. As a result, the scattered IR measurement light from the substrate and the unit under measurement effectively embodies information of the deep features of the substrate and the unit under measurement in the substrate and therefore allows these deep features in the substrate to be measured with higher sensitivity. Thus, characterizing parameters of the unit under measurement in the substrate can be accurately and effectively determined.

In these figures, 100, a substrate; 110, a unit under measurement; 111, a trench; 112, a buried structure; 120, a dielectric layer; 120*a*, a first dielectric layer; 120*b*, a second dielectric layer; 121, an opening; 200, a light source; and 210, a detector.

DETAILED DESCRIPTION

Scattering measurement methods and devices proposed in the present invention will be described in greater detail below with reference to the accompanying drawings, which illustrate specific embodiments thereof. From the following description, advantages and features of the invention will become apparent. Note that the figures are provided in a very simplified form not necessarily drawn to exact scale for the only purpose of helping to explain the disclosed embodiments in a more convenient and clearer way.

Figure 1:
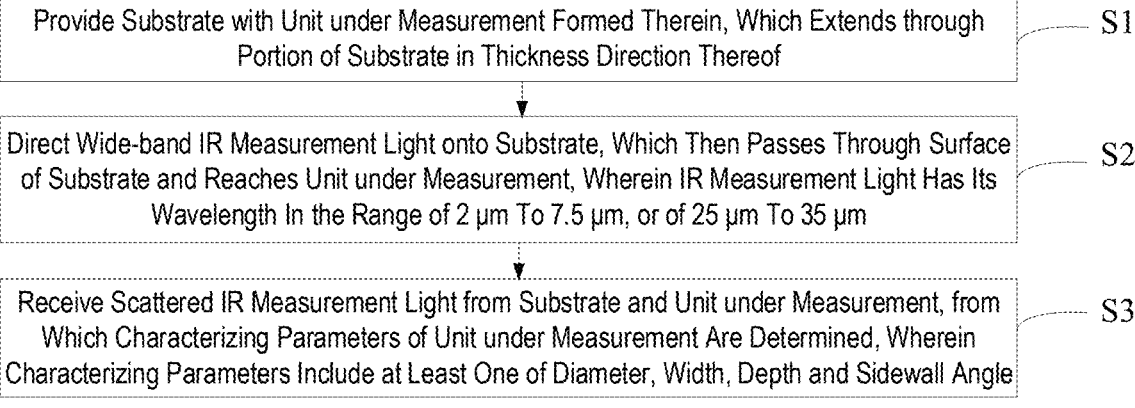
FIG. 1 is a schematic flowchart of a scattering measurement method according to an embodiment of the present invention.

FIG. 1 is a schematic flowchart of a scattering measurement method according to an embodiment of the present invention. As shown in FIG. 1, the method includes the steps of: (S1) providing a substrate, wherein a unit under measurement extending through a portion of the substrate in a thickness direction thereof is formed; (S2) directing wide-band infrared (IR) measurement light onto the substrate, wherein the wide-band IR measurement light passes through a surface of the substrate and reaches the unit under measurement, wherein the IR measurement light has a wavelength in the range of 2 μm to 7.5 μm, or of 25 μm to 35 μm; and (S3) receiving IR measurement light scattered from the substrate and from the unit under measurement, and determining characterizing parameters of the unit under measurement from the received IR measurement light, wherein the characterizing parameters include at least one of a diameter, a width, a depth and a sidewall angle.

Figure 2:
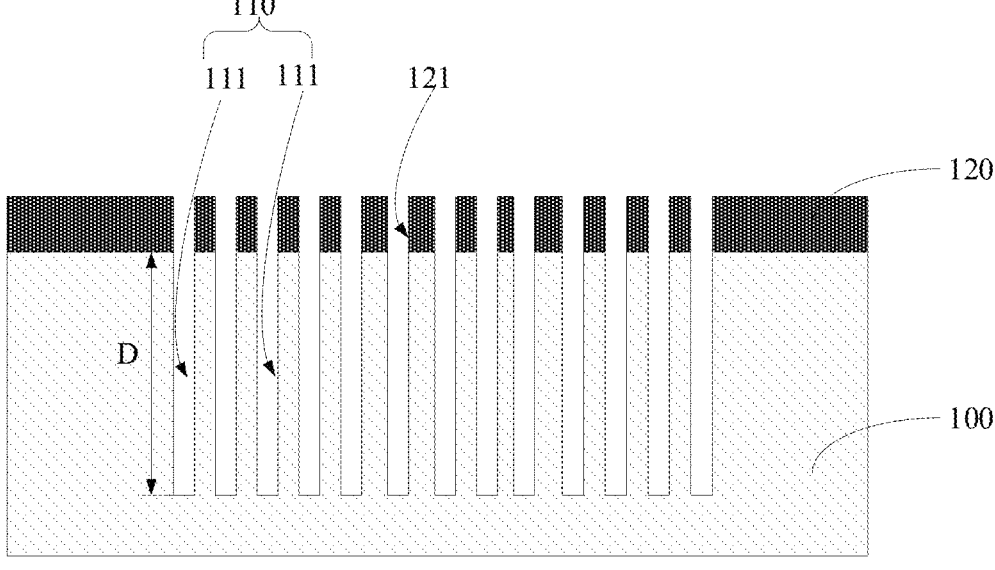
FIG. 2 is a schematic cross-sectional view of a substrate and a unit under measurement formed in a scattering measurement method according to an embodiment of the present invention.
Figure 3:
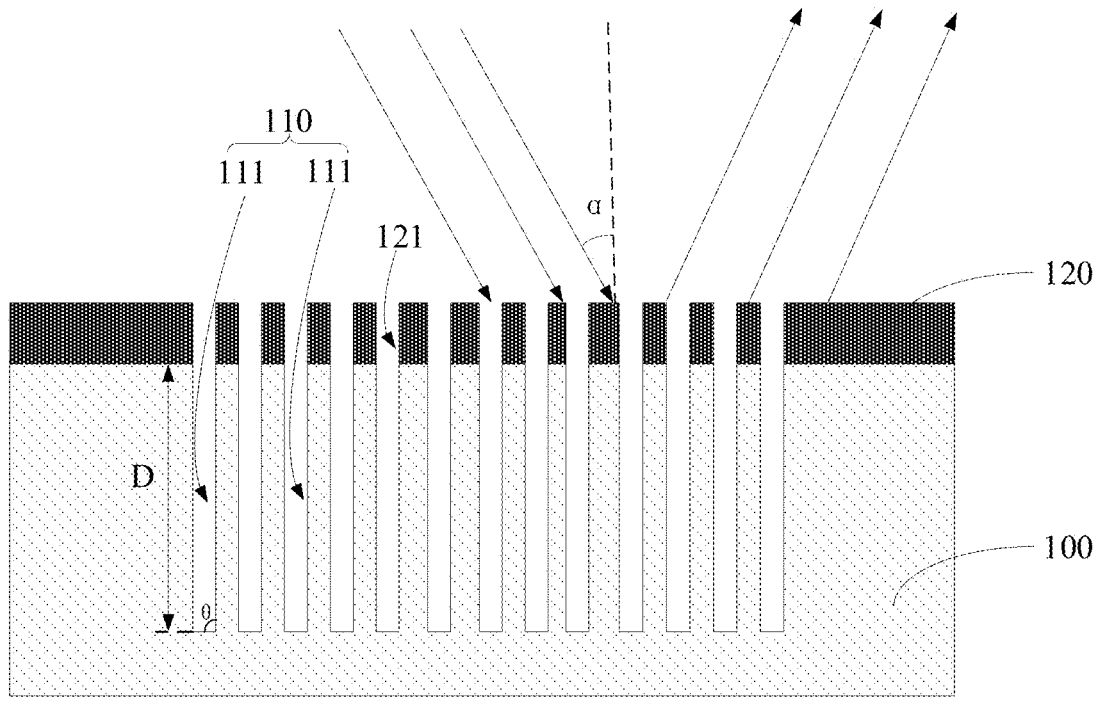
FIG. 3 schematically illustrates how IR measurement light is directed onto a substrate in a scattering measurement method according to an embodiment of the present invention.
Figure 4:
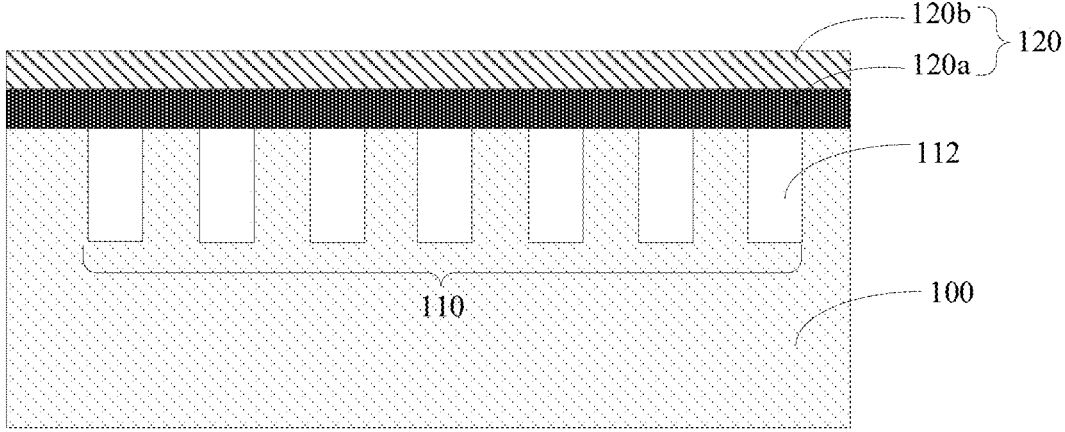
FIG. 4 is a schematic cross-sectional view of a substrate and a unit under measurement formed in a scattering measurement method according to another embodiment of the present invention.
Figure 5:
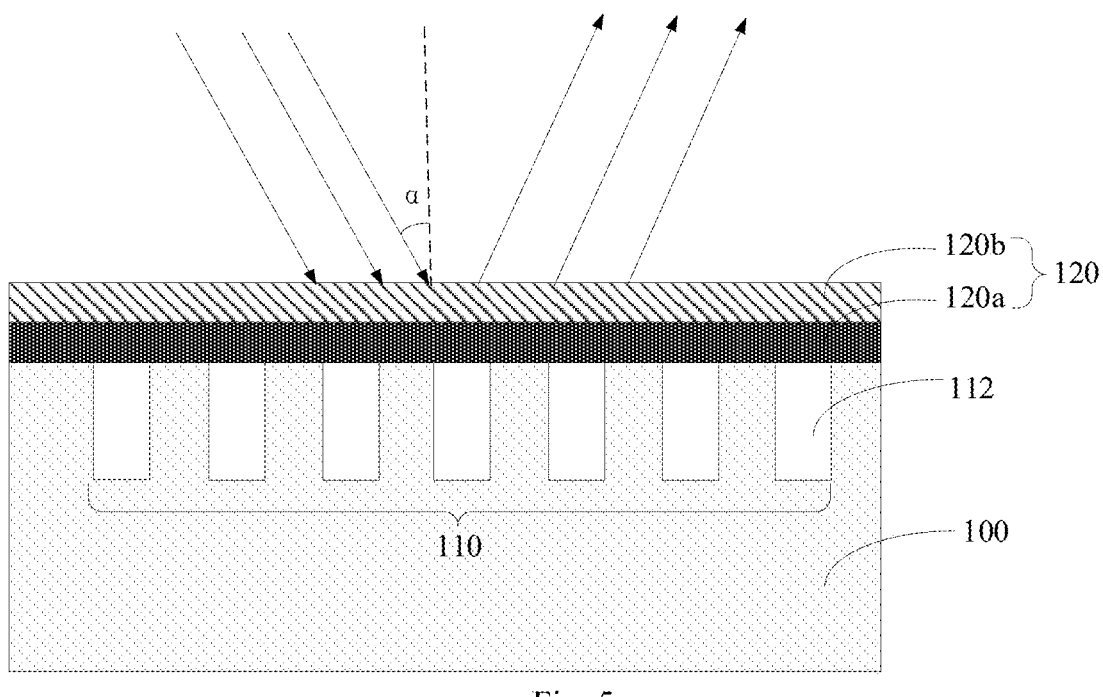
FIG. 5 schematically illustrates how IR measurement light is directed onto a substrate in a scattering measurement method according to another embodiment of the present invention.

FIG. 2 is a schematic cross-sectional view of a substrate and a unit under measurement formed in a scattering measurement method according to an embodiment of the present invention. FIG. 3 schematically illustrates how IR measurement light is directed onto a substrate in a scattering measurement method according to an embodiment of the present invention. FIG. 4 is a schematic cross-sectional view of a substrate and a unit under measurement formed in a scattering measurement method according to another embodiment of the present invention. FIG. 5 schematically illustrates how IR measurement light is directed onto a substrate in a scattering measurement method according to another embodiment of the present invention. Scattering measurement methods according to embodiments of the present invention will be described in greater detail below with reference to FIGS. 2 to 5.

As shown in FIG. 2, in step S1, a substrate 100 is provided. Material from which the substrate 100 may be made is monocrystal silicon.

Next, a unit under measurement 110 is formed in the substrate 100. The unit under measurement 110 extends through a portion of the substrate 100 in a thickness direction thereof.

In one embodiment, as shown in FIG. 2, the unit under measurement 110 includes at least one trench 111 each extending into the substrate 100 from a surface thereof. The trench 111 can serve as a deep trench or a contact hole. The unit under measurement 110 may be formed including first forming at least one dielectric layer 120 covering the substrate 100. For example, one dielectric layer, two dielectric layers or three dielectric layers may be formed. The dielectric layer(s) 120 may be made of at least one of silicon oxide, silicon nitride, silicon oxynitride and silicon fluoride. In case of two or more dielectric layers 120 being formed over the substrate 100, all of the dielectric layers may be stacked, and adjacent dielectric layers 120 may be formed of different materials. A total thickness of the dielectric layer(s) 120 may be 0.01 μm to 1 μm.

Subsequently, a patterned photoresist layer (not shown) is formed over the dielectric layer(s) 120, which exposes a portion of the dielectric layer(s) 120. Next, as shown in FIG. 2, a dry etching process is performed, with the patterned photoresist layer serving as a mask, to successively etch the dielectric layer(s) 120, in order to form at least one opening 121 each extending through the dielectric layer(s) 120 and exposing a portion of the substrate 100. After that, the exposed substrate 100 is etched to form at least one trench 111, wherein the trench 111 extends into the substrate 100 from a surface thereof and is in communication with a corresponding opening 121.

In non-limiting examples, the unit under measurement 110 may include two, three or six trenches 111. The number of trenches 111 may be determined as desired in practical applications. Each trench 111 may have a depth D of 1 μm to 30 μm, such as 1 μm, 2 μm, 3 μm, 5 μm, 10 μm, 12 μm, 15 μm, 20 μm, 25 μm or 30 μm. The diameter of the trench 111 may be, for example, 0.01 μm to 1 μm, the width may be 0.01 μm to 1 μm, and the sidewall angle can be 85° to 90°, but are not limited thereto. The diameter, width, and sidewall angle of the trench 111 may be set according to the actual process requirements. The cross-sectional shape of the trench 111 in the thickness direction of the substrate can be square or inverted trapezoidal, and the projection shape of the trench 111 on the surface of the substrate 100 may be square or circular.

In another embodiment, as shown in FIG. 4, the unit under measurement 110 includes at least one buried structure 112 each extending from the surface of the substrate 100 into the substrate 100. In a specific embodiment, the unit under measurement 110 may be formed according to a method including: at first, forming a patterned photoresist layer on the substrate 100, which exposes a portion of the substrate 100; then performing a dry etching process on the substrate 100 with the patterned photoresist layer serving as a mask to remove a portion thickness of the substrate 100, thereby forming at least one trench each optionally having a square or inverted trapezoidal cross-sectional shape; and after that, filling a buried layer in each trench to form the buried structure(s) 112. The buried structure(s) 112 may be made of at least one of silicon oxide, silicon nitride, siliconoxynitride, silicon fluoride, polysilicon and metal. All the buried structure(s) 112 may be made of the same material. A depth of each buried structure 112 in the substrate 100, i.e., a thickness of each buried structure 112, may be 1 μm to 30 μm, such as 1 μm, 2 μm, 3 μm, 5 μm, 10 μm, 12 μm, 15 μm, 20 μm, 25 μm or 30 μm. Each buried structure 112 may have a square or inverted trapezoidal cross-sectional shape.

Afterwards, at least one dielectric layer is formed over the substrate 100, which covers the unit under measurement 110. That is, the dielectric layer(s) cover(s) the substrate 100 and all the buried structure(s) 112. One dielectric layer 120, two dielectric layers 120 or three dielectric layers 120 may be formed over the substrate 100. For example, a first dielectric layer 120*a* and a second dielectric layer 120*b* may be formed over the substrate 100. It is noted that the present invention is not limited to any particular number of dielectric layers 120, and the number may be determined as desired in practical applications. The dielectric layer(s) 120 may be made of at least one of silicon oxide, silicon nitride, silicon oxynitride and silicon fluoride. In case of two or more dielectric layers 120 being formed over the substrate 100, all of them may be stacked, and adjacent dielectric layers 120 may be formed of different materials. For example, the first dielectric layer 120*a* and the second dielectric layer 120*b* may be made of different materials.

Next, in step S2, as shown in FIG. 3, wide-band IR measurement light is directed onto the substrate 100, which passes through the surface of the substrate 100 and reaches the unit under measurement 110. The IR measurement light is wide-band infrared light with a wavelength in the range of 2 μm to 7.5 μm to achieve low absorption and low attenuation of the infrared measurement light by the substrate 100, thereby improving the transmittance of the substrate 100. Optionally, the wavelength range of the IR measurement light may be 2.5 μm to 7 μm.

Alternatively, the IR measurement light is wide-band IR light with a wavelength in the range of 25 μm to 35 μm to achieve low absorption and low attenuation of the infrared measurement light by the substrate 100, thereby improving the transmittance of the substrate 100. Optionally, the wavelength range of the IR measurement light can be 29 μm to 35 μm.

In the embodiment shown in FIGS. 3 and 5, when the wide-band IR measurement light is directed onto the substrate, the IR measurement light passes through the dielectric layer 120 from the surface of the dielectric layer 120 in order to reach the substrate 100, and further passes through the substrate 100 to be directed onto the unit under measurement 110. Specifically, the IR measurement light is emitted from a light source, which may be implemented as a thermal radiation source or a light-emitting diode. During the process of using the IR measurement light to be directed onto the substrate 100, the IR measurement light is first directed onto the surface of the dielectric layer 120. A portion of the IR measurement light passes through the surface of the dielectric layer 120 and is directed onto the substrate 100 beneath the dielectric layer 120. After being directed onto the substrate 100, the IR measurement light may further penetrate through the substrate 100 so as to reach the unit under measurement 110 within the substrate 100. That is, the IR measurement light may pass through the substrate 100 without being completely absorbed and may reach the bottom of the unit under measurement 110, hence to reach the bottom of trench 111 of the unit under measurement 110 or the bottom of the buried structure 112 in the unit under measurement 110.

In the embodiment shown in FIG. 3, an angle of incidence a of the IR measurement light is 45° to 90°. Optionally, the angle of incidence a may be 55° to 65°. This can reduce errors introduced by the angle of incidence, resulting in improved measurement accuracy. The angle of incidence a is defined as an angle formed between the IR measurement light and a normal to the surface of the substrate 100, i.e., an angle formed between the IR measurement light and the vertical direction.

Figure 6:
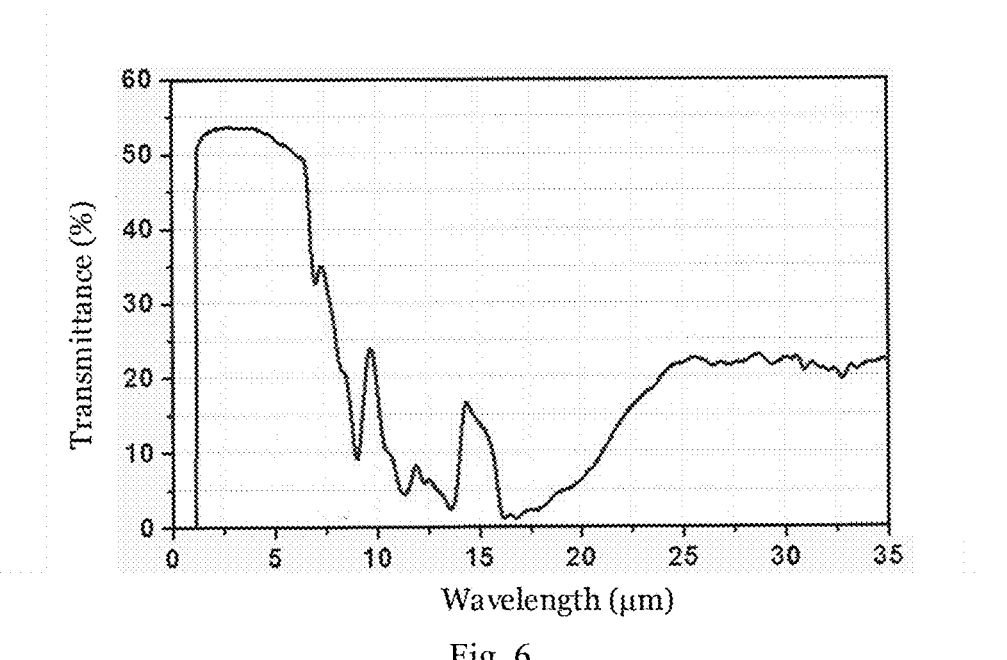
FIG. 6 schematically illustrates a relationship between the wavelength of measurement light and transmittance of a substrate in a scattering measurement method according to an embodiment of the present invention.

FIG. 6 schematically illustrates a relationship between a wavelength of IR measurement light and transmittance of the substrate in the scattering measurement method according to an embodiment of the present invention. As shown in FIG. 6, the substrate exhibits high transmittance for IR measurement light with a wavelength in the range of 2 μm to 7.5 μm, or of 25 μm to 35 μm, which allows the IR measurement light to effectively transmit the substrate 100 to reach the unit under measurement 110, more precisely, the bottom of the unit under measurement 110. Thus, after the IR measurement light is scattered within the substrate 100 and the unit under measurement 110, the IR measurement light scattered by the substrate 100 and the unit under measurement 110 can effectively reflect the information of deep features of the substrate 100 and the unit under measurement 110 within the substrate 100, thereby providing more accurate measurement results.

After that, in step S3, IR measurement light scattered (or reflected) from the substrate 100 and the unit under measurement 110 is received, i.e., receiving the scattered light from the substrate 100 and the unit under measurement 110, and characterizing parameters of the unit under measurement 110, which include at least one of a diameter, a width, a depth and a sidewall angle, are determined from the received IR measurement light.

In one embodiment, a detector may be used to receive the IR measurement light scattered from the substrate 100 and the unit under measurement 110. The detector may be, for example, an image sensor. The scattered IR measurement light received from the substrate 100 and the unit under measurement 110 may be analyzed with a model-based algorithm to determine the characterizing parameters of the unit under measurement 110 (analyzing the spectrum of the scattered light scattered by the substrate 100 and the unit under measurement 110). The model-based algorithm may be rigorous coupled-wave analysis (RCWA), regression analysis or the like.

In one embodiment, the diameter of the unit under measurement 110 refers to a diameter of the trench(es) 111 or buried structure(s) 112 (or the length of the buried structure(s) 112) in the unit under measurement 110; the width of the unit under measurement 110 refers to a width of the trench(es) 111 or buried structure(s) 112 in the unit under measurement 110. Moreover, the depth of the unit under measurement 110 refers to a depth of the trench(es) 111 in the unit under measurement 110, or a depth of the buried structure(s) 112 within the substrate 100, i.e., a thickness of the buried structure(s) 112. Further, the sidewall angle θ of the unit under measurement 110 refers to a sidewall-to-bottom angle of the trench(es) 111 or buried structure(s) 112 in the unit under measurement 110.

In the above-described step of directing the wide-band IR measurement light onto the substrate 100, the IR measurement light has a wavelength in the range of 2 μm to 7.5 μm, or of 25 μm to 35 μm, which enables the IR measurement light to effectively transmit through the substrate 100 and impinge onto the unit under measurement 110. Accordingly, the resulting scattered IR measurement light from the substrate 100 and the unit under measurement 110 effectively embodies information of deep features of the substrate 100 and the unit under measurement 110 in the substrate 100 and therefore allows these deep features to be measured with higher sensitivity.

For example, the depth of the opening 111 in the unit under measurement 110 is 3 μm, the broadband visible light with a wavelength of 0.3 μm-0.9 μm is used to measure the characterizing parameters (width, depth, and sidewall angle) of the unit under measurement, and the measurement sensitivity is 0.023. Using the infrared measurement light provided in this embodiment with wavelength in the range of 2 μm to 7.5 μm or 25 μm to 35 μm to measure the characterizing parameters of the unit under measurement, the measurement sensitivity reaches at least 0.381. Therefore, the scattering measurement method of the present invention can be used to measure deep features in a substrate with higher sensitivity and thus to accurately and effectively determine characterizing parameters of a unit under measurement in the substrate.

Figure 7:
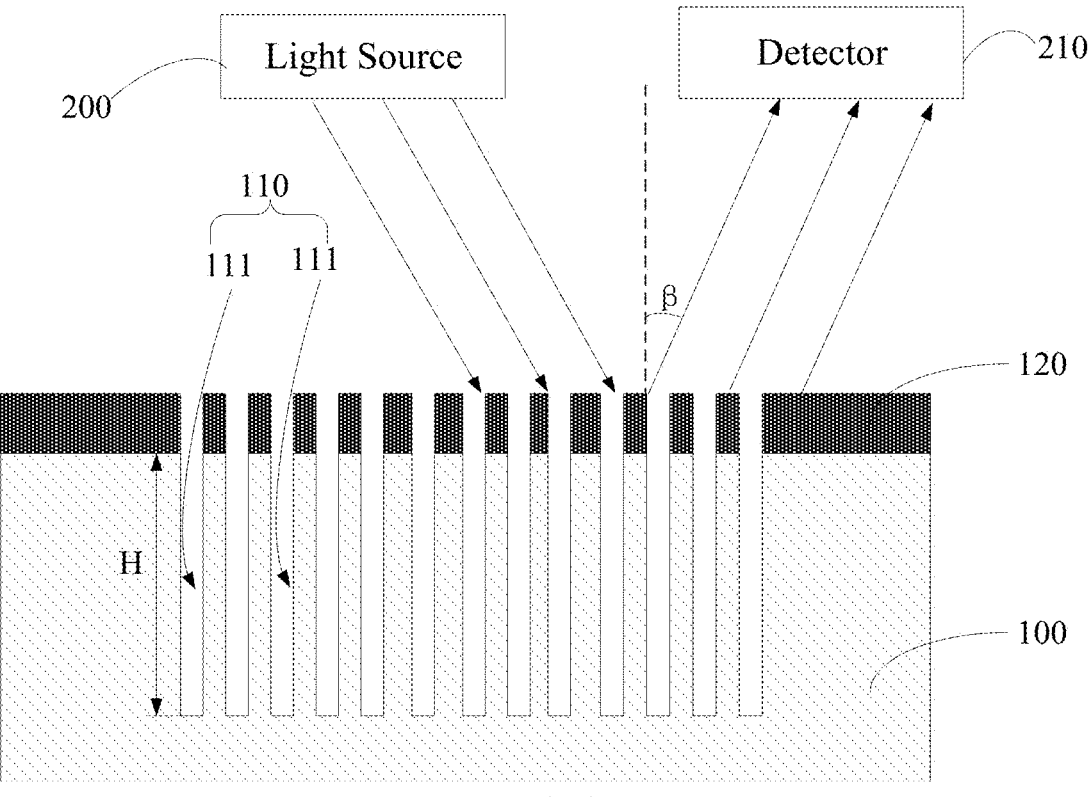
FIG. 7 schematically illustrates principle of a scattering measurement device according to an embodiment of the present invention.

FIG. 7 schematically illustrates principle of a scattering measurement device according to an embodiment of the present invention. As shown in FIG. 7, the scattering measurement device includes a light source 200 for providing wide-band IR measurement light, which can pass through a surface of a substrate 100 and reach a unit under measurement 110 in the substrate 100. The unit under measurement 110 extends through a portion of the substrate 100 in a thickness direction thereof. The IR measurement light has a wavelength in the range of 2 μm to 7.5 μm, or of 25 μm to 35 μm. A detector 210 for receiving scattered IR measurement light from the unit under measurement 110, wherein characterizing parameters of the unit under measurement 110 are determined from the scattered IR measurement light, and wherein the characterizing parameters include at least one of a diameter, a width, a depth and a sidewall angle. The detector 210 may be an image sensor, such as charge coupled device (CCD).

According to embodiments of the present invention, the detector 210 is disposed above and spaced apart from the dielectric layer(s). The detector may receive the light at an angle β of 30° to 70°, preferably 45° to 55°. This allows the scattered IR measurement light with higher intensity to be received from the substrate 100 and the unit under measurement 110, resulting in higher measurement accuracy.

In summary, the present invention provides a scattering measurement method and device, in which wide-band IR measurement light is directed onto a substrate and then passes through a surface of the substrate and reaches a unit under measurement. The IR measurement light has a wavelength in the range of 2 μm to 7.5 μm, or of 25 μm to 35 μm. Scattered IR measurement light is then received from the substrate and the unit under measurement, from which characterizing parameters of the unit under measurement are determined. Since the wavelength of the IR measurement light is in the range of 2 μm to 7.5 μm, or of 25 μm to 35 μm, the IR measurement light can effectively travel through the substrate and impinge onto the unit under measurement. As a result, the scattered IR measurement light from the substrate and the unit under measurement effectively embodies information of deep features of the substrate and the unit under measurement in the substrate, and therefore allows these deep features to be measured with higher sensitivity. Thus, the characterizing parameters of the unit under measurement in the substrate can be accurately and effectively determined.

The description presented above is merely that of some preferred embodiments of the present invention and is not intended to limit the scope thereof in any sense. Any and all changes and modifications made by those of ordinary skill in the art based on the above teachings fall within the scope of the invention.

Further, it is recognized that while the invention has been described above with reference to preferred embodiments thereof, it is not intended to be limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent changes and modifications made to the foregoing embodiments based on the substantive disclosure of the invention without departing from the scope thereof fall within this scope.

The invention claimed is:

1. A scattering measurement method, comprising:

providing a substrate with a unit under measurement formed therein, wherein the unit under measurement extends through a portion of the substrate in a thickness direction thereof;

directing wide-band infrared (IR) measurement light onto the substrate, wherein the IR measurement light passes through a surface of the substrate and reaches the unit under measurement, and wherein the IR measurement light has a wavelength in a range of 2 μm to 7.5 μm, or of 25 μm to 35 μm; and receiving scattered IR measurement light from the substrate and the unit under measurement, wherein characterizing parameters of the unit under measurement are determined from the scattered IR measurement light, and wherein the characterizing parameters include at least one of a diameter, a width, a depth and a sidewall angle.

2. The scattering measurement method of claim 1, forming at least one dielectric layer over the substrate, wherein the IR measurement light transmits through the at least one dielectric layer from a surface thereof and impinges onto the substrate.

3. The scattering measurement method of claim 2, wherein the at least one dielectric layer is made of at least one of silicon oxide, silicon nitride, silicon oxynitride and silicon fluoride.

4. The scattering measurement method of claim 2, forming at least one opening in the at least one dielectric layer, wherein each opening extends through the at least one dielectric layer, and wherein the unit under measurement comprises at least one trench, each trench extending from the surface of the substrate into the substrate and communicating with a corresponding opening.

5. The scattering measurement method of claim 4, wherein a projection shape of each opening on the surface of the substrate is square or circular, and wherein each trench has a depth of 1 μm to 20 μm.

6. The scattering measurement method of claim 2, wherein the dielectric layer further covers the unit under measurement, and wherein the unit under measurement comprises at least one buried structure each extending from the surface of the substrate into the substrate.

7. The scattering measurement method of claim 6, wherein a material of the buried structure includes at least one of silicon oxide, silicon nitride, silicon oxynitride, silicon fluoride, polysilicon and metal, and wherein each buried structure has an inverted trapezoidal shape or a square cross-sectional shape.

8. The scattering measurement method of claim 6, wherein the substrate is made of monocrystal silicon.

9. The scattering measurement method of claim 1, wherein when the IR measurement light is directed onto the substrate, an angle of incidence of the IR measurement light is 45° to 90°.

10. A scattering measurement device, comprising:

a light source for providing wide-band infrared (IR) measurement light, wherein the IR measurement light passes through a surface of a substrate and reaches a unit under measurement in the substrate, wherein the unit under measurement extends through a portion of the substrate in a thickness direction thereof, and wherein the IR measurement light has a wavelength in a range of 2 μm to 7.5 μm, or of 25 μm to 35 μm; and a detector for receiving scattered IR measurement light from the unit under measurement, wherein characterizing parameters of the unit under measurement are determined from the scattered IR measurement light, and wherein the characterizing parameters include at least one of a diameter, a width, a depth and a sidewall angle.

\* \* \* \* \*